United States Patent [19]

Asahi et al.

[11] Patent Number: 5,182,362
[45] Date of Patent: Jan. 26, 1993

[54] PROCESS FOR PRODUCING VINYL CHLORIDE RESIN OF IMPROVED DISPERSIBILITY BY DEHYDRATION OF LATEX

[75] Inventors: Masaki Asahi; Yukio Noro, both of Yokkaichi, Japan

[73] Assignee: Mitsubishi Kasei Vinyl Company, Tokyo, Japan

[21] Appl. No.: 726,726

[22] Filed: Jul. 1, 1991

Related U.S. Application Data

[63] Continuation of Ser. No. 299,537, Jan. 23, 1989, abandoned.

[30] Foreign Application Priority Data

Feb. 15, 1988 [JP] Japan ................................. 1-32462

[51] Int. Cl.$^5$ ............................. C08F 6/22; C08F 6/14
[52] U.S. Cl. .................................. 528/486; 528/502; 528/503
[58] Field of Search ................. 528/486, 501, 503, 502

[56] References Cited

U.S. PATENT DOCUMENTS 2,729,627  1/1956  Carr, Jr. ............................ 526/344.2
3,277,064  10/1966  Lovelock ............................ 526/194
4,479,879  10/1984  Hashimoto ........................ 210/727

OTHER PUBLICATIONS

Database WPIL No. 86-323231, Derwent Publicat. Ltd. London, GB; JP-A-61241106 (Mitsubishi Tayon K.K.) Oct. 27, 1986 *abstract*.
Database WPIL, No. 87-076497, Derwent Publicat. Ltd. London, GB; & JP-A-62030106 (Japan Synthetic Rubber) Feb. 9, 1987 *abstract*.

*Primary Examiner*—Christopher Henderson
*Attorney, Agent, or Firm*—Oblon, Spivak, McClelland, Maier & Neustadt

[57] ABSTRACT

A process for producing a granular vinyl chloride resin from a vinyl chloride resin latex prepared by emulsion polymerization or fine suspension polymerization, which comprises:
(A) a step of flocculating the vinyl chloride resin latex,
(B) a step of dehydrating the flocculated vinyl chloride resin to a water content of at most 50% by weight by means of a filter press dehydrator, a belt press dehydrator or a tube press dehydrator, and
(C) a step of drying the dehydrated vinyl chloride resin at a temperature of lower than 80° C.

8 Claims, No Drawings

PROCESS FOR PRODUCING VINYL CHLORIDE RESIN OF IMPROVED DISPERSIBILITY BY DEHYDRATION OF LATEX

This application is a continuation of application Ser. No. 07/299,537, filed on Jan. 23, 1989, now abandoned.

BACKGROUND OF THE INVENTION

The present invention relates to a process for producing a granular vinyl chloride resin, which is useful as a paste resin having a large bulk density and excellent powder flowability and being low-dusting and easy to handle.

FIELD OF THE INVENTION

A vinyl chloride paste resin is prepared usually by a process which comprises spray-drying a latex containing vinyl chloride resin particles of at most 2 μm obtained by emulsion polymerization or fine suspension polymerization of a vinyl chloride monomer, and then pulverizing the firmly agglomerated coarse particles thereby obtained. The vinyl chloride resin obtained by such a process is a fine powder having a small bulk density and being highly dusting, whereby the environmental hygiene for packaging operation is poor, and the packaging costs and transportation costs are high, thus being economically disadvantageous. Further, such a vinyl chloride resin is substantially inferior in the powder flowability as compared with the vinyl chloride resin prepared by suspension polymerization or bulk polymerization. Accordingly, it has been difficult to employ e.g. an automatic measuring device, and there has been a limitation in the improvement of the handling operation.

In order to overcome the above drawbacks, a method of granulating the vinyl chloride paste resin has been proposed in Japanese Unexamined Patent Publication No. 74853/1977. However, according to this method, a vinyl chloride paste resin which has once been dried, is granulated in a separate step. Thus, it is disadvantageous from the operational or economical view point. Further, Japanese Unexamined Patent Publication No. 155403/1984 discloses a process which comprises adding a flocculating agent to a vinyl chloride resin latex to flocculate the vinyl chloride resin particles, then dehydrating the flocs by a decanter, and drying the patty-like wet cake thereby obtained. However, in this process, the wet cake tends to deposit inside the casing of the decanter, and it used to be difficult to conduct the operation continuously under a stabilized condition on an industrial scale.

SUMMARY OF THE INVENTION

Under these circumstances, the present inventors have conducted extensive researches for a process for producing a vinyl chloride resin which is low-dusting and easy to handle and has excellent powder flowability and, as a result, have found that a granular vinyl chloride resin which can be used as a paste resin constantly on an industrial scale, can efficiently be obtained by breaking a vinyl chloride resin latex without spray drying, to let the vinyl chloride resin particles flocculate, then dehydrating the flocculated particles under pressure by means of e.g. a belt press, and then drying the dehydrated particles at a relatively low temperature. The present invention has been accomplished on the basis of this discovery.

Namely, it is an object of the present invention to provide a process for producing a granular vinyl chloride resin which has a large bulk density and excellent flowability and which is low-dusting and easy to handle.

The present invention provides a process for producing a granular vinyl chloride resin from a vinyl chloride resin latex prepared by emulsion polymerization or fine suspension polymerization, which comprises:

(A) a step of flocculating the vinyl chloride resin latex, (B) a step of dehydrating the flocculated vinyl chloride resin to a water content of at most 50% by weight by means of a filter press dehydrator, a belt press dehydrator or a tube press dehydrator, and (C) a step of drying the dehydrated vinyl chloride resin at a temperature of lower than 80° C.

DESCRIPTION OF THE PREFERRED EMBODIMENTS

The vinyl chloride resin latex to be used in the present invention may be one prepared by a fine suspension polymerization or emulsion polymerization of vinyl chloride or a mixture of vinyl chloride and a comonomer copolymerizable therewith. The comonomer copolymerizable with vinyl chloride includes, for example, a vinyl ester such as vinyl acetate, vinyl propionate or vinyl laurate, an acrylate such as methyl acrylate, ethyl acrylate or butyl acrylate, a methacrylate such as methyl methacrylate or ethyl methacrylate, a maleate such as dibutyl maleate or diethyl maleate, a fumarate such as dibutyl fumarate or diethyl fumarate, a vinyl ether such as vinyl methyl ether, vinyl butyl ether or vinyl octyl ether, a vinyl cyanide such as acrylonitrile or methacrylonitrile, an α-olefin such as ethylene, propylene or stylene, and a vinyl halide other than vinyl chloride such as vinylidene chloride or vinyl bromide. Such a comonomer is used in an amount within a range of not more than 30% by weight, preferably not more than 20% by weight, of the components constituting the vinyl chloride resin.

However, the comonomer is not limited to the specific examples given above.

The concentration of the solid content in the vinyl chloride resin latex varies depending upon the proportions of the polymerizable monomers and water, the additives and the degree of polymerization. Taking into accounts the dehydration after the flocculation of the latex and the size of the apparatus, the higher the concentration of the solid content, the better. It is usually preferred to use a latex wherein the solid content is within a range of at least 30% by weight relative to the entire latex.

Referring to step (A) in the process of the present invention, various conventional methods may be employed for flocculating the vinyl chloride resin latex, including, for example, a method of applying a mechanical shearing force such as a high speed agitation, a method of applying a supersonic wave, a method of heating the latex by e.g. steam, a method of freezing the latex by a freezing medium, a method of decomposing the emulsifying agent by an addition of a strong acid or a strong alkali, and a method of adding a flocculating agent. Among them, the method of adding a flocculating agent is most preferred, since the flocculation of the latex can thereby be conducted simply and completely, and the operation is easy. As the flocculating agent, a conventional flocculating agent such as a polyvalent metal salt such as alum, magnesium sulfate or calcium acetate, or a polymer flocculating agent such as alginic acid, polyamine or polyacrylamide, may be used. Among them, an alkaline earth metal salt other than a halide is most suitable, since it is capable of breaking many kinds of latex emulsifier systems. This alkaline earth metal salt provides an effect such that its reaction product with an emulsifier serves as a heat stabilizer.

As a method of breaking a vinyl chloride resin latex by means of a flocculating agent, it is possible to employ a method wherein a flocculating agent is added to the vinyl chloride resin latex under stirring such as simple mechanical stirring, stirring by means of a jet pump or stirring by airing, or a method wherein the resin latex and a flocculating agent are supplied to a twin screw extruder type mixing machine in a predetermined ratio.

The most preferred embodiment of the present invention is a method wherein a highly concentrated resin latex and a flocculating agent are supplied to a twin screw extruder type mixing machine. By this method, it is possible to break by the shearing force of the twin screws any firm water-containing agglomerate structure formed by flocculation of vinyl chloride resin particles, whereby it is possible to obtain flocs which are uniform and do not entrap water.

In a case where a flocculating agent is added to a highly concentrated resin latex having a solid content of from 40 to 50% by weight under the above-mentioned simple stirring, the vinyl chloride resin particles tend to form flocs having poor flowability, whereby it will be difficult not only to continue stirring, but also to obtain uniform flocs, and thus it is likely that in the subsequent dehydration step (B), the filtrate tends to be turbid. On the other hand, mixing a flocculating agent after diluting the resin latex to a solid content of from 15 to 20% by weight is preferred in the sense that uniform flocs can thereby be obtained while the flowability is maintained even after the flocculation. However, such a method is economically disadvantageous since the latex is diluted with water prior to the dehydration step. In this case, it is advisable to add the flocculating agent after adjusting the concentration of the solid content to a level of about 30% by weight.

In such a flocculation operation, vinyl chloride resin particles having a particle size of at most 2 μm can be recovered by means of a filter cloth having openings of about 150 μm.

Referring to step (B) of the present invention, a filter press dehydrator, a belt press dehydrator or a tube press dehydrator is used to recover the vinyl chloride resin particles from the broken vinyl chloride resin latex. Among them, it is preferred to employ the belt press dehydrator or the tube press dehydrator, since the operation can be conducted continuously and a large pressure can be applied.

For example, in order to recover the vinyl chloride resin particles by means of the belt press dehydrator or the tube press dehydrator, the broken vinyl chloride resin latex, i.e. the flocculated vinyl chloride resin, is continuously supplied on a belt or into a tube and dehydrated to a water content of at most 50% by weight, preferably at most 40% by weight, by the belt press under a face pressure of at least 1 kg/cm$^2$ and a linear pressure of at least 1 kg/cm, or by the tube press under a face pressure of at least 40 kg/cm$^2$. In order to granulate the recovered vinyl chloride resin particles, the water content should be adjusted to the above range, and the dehydration to the above level of water content can readily be conducted by exerting a pressure.

The flocs of the vinyl chloride resin particles dehydrated to a water content of at most 50% by weight, are obtained in the form of a sheet. Such a sheet can be pulverized into granules, as the case requires. Otherwise, the pulverized product is further granulated by supplying it to a conventional granulating machine of e.g. a screw type or a pressure type.

Referring to step (C) in the process of the present invention, the dehydrated vinyl chloride resin is dried by a conventional drying machine which is commonly used for drying a vinyl chloride resin prepared by a usual suspension polymerization, such as a tray dryer, a fluidized dryer or a rotary kiln. It is particularly preferred to employ a rotary kiln in view of the drying efficiency and in view of the fact that the dehydrated flocs of vinyl chloride resin particles do not disintegrate to fine powder. The drying condition in the process of the present invention is selected from a temperature range of less than 80° C., preferably from 10° to 70° C., more preferably from 30° to 60° C.

When a vinyl chloride resin is formed into a plastisol, the viscosity of the plastisol is governed by the thermal history. Therefore, in the case of drying at a high temperature, the heating time should be set to be short. When the vinyl chloride resin is formed into granules as in the process of the present invention, the surface area per unit weight decreases, and it becomes difficult to dry it in a short period of time. Accordingly, in the process of the present invention, the drying is required to be conducted at a relatively low temperature, and it is important that the thermal history of the vinyl chloride resin is kept low. If the drying temperature exceeds 80° C., there will be difficulties such that when the obtained vinyl chloride resin is formed into a plastisol, the viscosity tends to be extremely high, or it tends to be difficult to obtain a flowable plastisol. On the other hand, if the drying temperature is lower than 10° C., the drying time tends to be long, and the drying efficiency will be poor, thus leading to poor productivity.

The granular vinyl chloride resin obtained by the process of the present invention is useful as a vinyl chloride paste resin for e.g. a floor material, a wall material or an interior material of automobiles, or it is useful as a flowability-improver for a vinyl chloride resin obtained by suspension polymerization or bulk polymerization.

According to the process of the present invention, the majority of water is mechanically removed in contrast to a spray drying method wherein the entire water in the vinyl chloride resin latex is evaporated by heat energy. Therefore, the energy for drying may be substantially small, such being economically advantageous and extremely advantageous from the industrial point of view. Further, the granular vinyl chloride resin obtained by the process of the present invention has a large bulk density and excellent powder flowability and is low-dusting, whereby it is possible to employ an automatic measuring device, the environmental hygiene at the sites of packaging operation, shipping operation and unpackaging operation can be improved, and various costs such as costs for packaging and transportation can be reduced due to an increase of the bulk density.

Further, the granular vinyl chloride resin obtained by the process of the present invention is in the form of loose flocs, and when it is mixed with a plasticizer and stirred to some extent, the flocs can readily be deflocculated to form a plastisol having a low viscosity.

Now, the method of the present invention will be described in detail with reference to Examples. However, it should be understood that the present invention is by no means restricted to such specific Examples.

The physical property test of the vinyl chloride resins prepared by the processes of the Examples and Comparative Examples were conducted as described below, and the results are shown in Table 1.

Bulk Density and Powder Flowability

Bulk density: Measured in accordance with JIS K-6721.

Powder flowability: 60 g of a sample (a vinyl chloride resin) was put in a funnel of the bulk density measuring device, and the time from the withdrawal of the dumper till all the sample has dropped from the funnel, was measured. The shorter the dropping time, the better the powder flowability.

Viscosity of a Plastisol

A plastisol having the following composition was prepared at a temperature of 23° C. under a relative humidity of 50%, and the viscosity was measured by a Brookfield viscometer at a rotational speed of No. 6 spindle of 50 rpm.

| Vinyl chloride resin | 100 parts by weight |
| DOP (Di-2-ethylhexylphthalate) | 60 parts by weight |
| Polyoxyethyleneoctylphenol ether | 1 part by weight |

Test for Graining in a Plastisol

This test was conducted in accordance with JIS K-5500 "graining test (B)".

EXAMPLE 1

A vinyl chloride resin latex having an average particle size of 0.9 μm and a solid content of 40% by weight (water content: 60% by weight) was obtained by fine suspension polymerization using an ammonium salt of a higher fatty acid as the main emulsifier in an aqueous medium. The latex was subjected to filtration by a screen of 235 mesh (63 μm). Then, the latex and a 10% calcium acetate aqueous solution were supplied to a twin screw extruder in a ratio of 4 parts by weight of the aqueous calcium acetate solution to 100 parts by weight of the latex by means of a quantitative pump.

Creamy flocs having a water content of 62% discharged from the twin extruder were supplied to a tube press (manufactured by Ashizawa Tekko K.K.) and dehydrated under a pressure of 100 kg/cm² for two minutes. The filtrate was transparent. The dehydrated cake of flocs had a water content of 24%. The cake was pulverized and sieved to obtain particles of from 0.5 to 2 mm. These particles were put into a rotary dryer equipped with a heat conducting tube and dried under reduced pressure at 30° C. for two hours to obtain a granular vinyl chloride resin.

EXAMPLE 2

A vinyl chloride resin latex having an average particle size of 0.9 μm and a solid content of 40% by weight (water content: 60% by weight) was obtained by fine suspension polymerization using an ammonium salt of a higher fatty acid as the main emulsifier in an aqueous medium. The latex was subjected to filtration with a screen of 235 mesh (63 μm). Then, the latex and a 10% calcium acetate aqueous solution were supplied to a twin screw extruder in a ratio of 4 parts by weight of calcium acetate to 100 parts by weight of the latex by means of a quantitative pump.

Creamy flocs having a water content of 62% discharged from the twin screw extruder, was supplied to a belt press dehydrator and dehydrated under a face pressure of 5 kg/cm² and a linear pressure of 60 kg/cm. The filtrate was transparent. The dehydrated cake had a water content of 35%. This cake of flocs was pulverized and sieved to obtain particles of from 0.5 to 2 mm. These particles were put into a rotary dryer equipped with a heat conducting tube and dried under reduced pressure at 30° C. for two hours to obtain a granular vinyl chloride resin.

EXAMPLES 3 TO 6

Granular vinyl chloride resins were obtained in the same manner as in Example 1 except that the drying conditions in the rotary dryer in Example 1 were changed to 40° C. for one hour (Example 3), 50° C. for 30 minutes (Example 4), 60° C. for 30 minutes (Example 5) and 70° C. for 30 minutes (Example 6), respectively.

COMPARATIVE EXAMPLE 1

The operation was conducted in the same manner as in Example 1 except that the drying condition in the rotary dryer in Example 1 was changed to 80° C. for 30 minutes.

COMPARATIVE EXAMPLE 2

The vinyl chloride resin latex obtained in Example 1, was subjected to spray drying by means of a spray dryer equipped with a spraying device of a rotary disc type at an inlet temperature of 170° C. and an outlet temperature of 52° C. and pulverized by a pulverizer to obtain fine powdery vinyl chloride resin.

TABLE 1

|  | Examples | | | | | | Comparative Examples | |
| --- | --- | --- | --- | --- | --- | --- | --- | --- |
|  | 1 | 2 | 3 | 4 | 5 | 6 | 1 | 2 |
| Bulk density (g/cc) | 0.53 | 0.45 | 0.53 | 0.47 | 0.51 | 0.47 | 0.48 | 0.26 |
| Flowability (sec) | 16.3 | 18.0 | 17.2 | 17.5 | 16.5 | 16.9 | 17.2 | Not flowable |
| Sol viscosity (centipoise) | 4,800 | 4,500 | 5,100 | 6,400 | 9,700 | 20,500 | Sol did not form | 4,200 |
| Graining test result (μm) | 30 | 31 | 49 | 59 | 83 | 95 | >100 | 56 |

We claim:

1. A process for producing a granular vinyl chloride resin of improved dispersibility for a paste resin from a vinyl chloride resin latex prepared by fine suspension polymerization, which comprises:

(A) flocculating the vinyl chloride resin latex,
   (B) dehydrating the flocculated vinyl chloride resin to a water content of at most 50% by weight by means of a filter press dehydrator, a belt press dehydrator or a tube press dehydrator, and
   (C) drying the dehydrated vinyl chloride resin at a temperature of from 30° to 60° C.

2. The process according to claim 1, wherein the vinyl chloride resin latex has a solid content of at least 30% by weight.

3. The process according to claim 1, wherein the flocculation is conducted by adding a flocculating agent to the vinyl chloride resin latex.

4. The process according to claim 3, wherein the flocculating agent is an alkaline earth metal salt other than a halide.

5. The process according to claim 1, wherein the flocculation is conducted by means of a twin screw extruder by introducing the vinyl chloride resin latex in a highly concentrated state together with a flocculating agent into the extruder.

6. The process according to claim 1, wherein the dehydration is conducted by the belt press dehydration under a face pressure of at least 1 kg/cm$^2$ and a linear pressure of at least 1 kg/cm, or by the tube press dehydrator under a face pressure of at least 40 kg/cm$^2$.

7. The process according to claim 1, wherein the dehydration is conducted to a water content of at most 40% by weight.

8. A process for producing a granular vinyl chloride resin of improved dispersibility for paste resin from a vinyl chloride resin latex prepared by emulsion polymerization or fine suspension polymerization, which comprises:

(A) flocculating the vinyl chloride resin latex, (B) dehydrating the flocculated vinyl chloride resin to a water content of at most 50% by weight by means of a filter press dehydrator, a belt press dehydrator or a tube press dehydrator, and (C) drying the dehydrated vinyl chloride resin at a temperature of from 30° to 60° C., wherein the dehydration is conducted by the belt press dehydration under a face pressure of at least 1 kg/cm$^2$ and a linear pressure of at least 1 kg/cm, or by the tube press dehydrator under a face pressure of at least 40 kg/cm$^2$.

* * * * *